Patented Sept. 19, 1922.

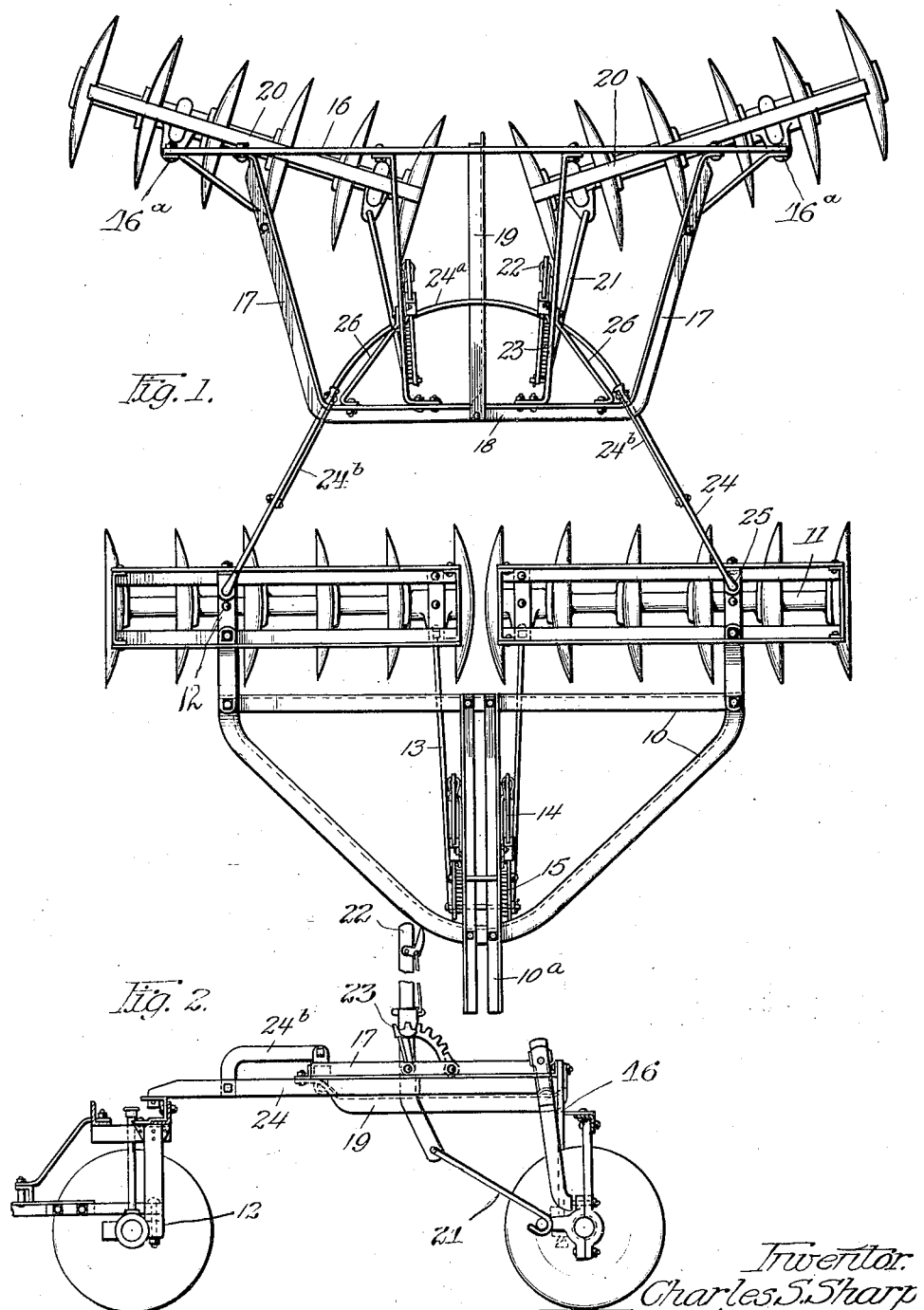

1,429,462

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

TANDEM DISK HARROW.

Application filed March 19, 1919. Serial No. 283,590.

*To all whom it may concern:*

Be it known that I, CHARLES S. SHARP, a citizen of the United States, residing at Auburn, in the county of Cayuga and State of New York, have invented certain new and useful Improvements in Tandem Disk Harrows, of which the following is a full, clear, and exact specification.

This invention relates to tandem disk harrows.

An object of this invention is to provide a tandem disk harrow with means for coupling the front and rear sections in such a way as to permit the harrow sections to change their positions relative to each other when the harrow is turned or backed.

Another object is to accomplish this result with a structure which is at once simple and economical to manufacture.

With these and other objects in view my invention consists of a tillage implement having front and rear sections, a curved bar attached to one section at its ends and normally connected to the other section intermediate its ends.

Reference is now had to the drawings in which,

Figure 1 is a plan view of my tandem disk harrow, showing the front gangs straight and the rear gangs angled; and Fig. 2 is a partial vertical section showing both sets of gangs straight.

I have preferred to illustrate my invention in connection with a tandem disk harrow having front and rear harrow sections. The front harrow section has a frame 10 to which is pivotally attached front disk gangs 11 at the hinges 12. The inner ends of the front gangs are connected to the draft members 10$^a$ which form a part of the frame by means of rods 13 and are made adjustable so as to be set at various angles by means of the levers 14 operating on quadrants 15. The frame of the rear section consists of a bar 16 disposed in a vertical plane and a horizontal member secured thereto having forwardly converging elements 17 and a straight element 18. All of these elements preferably lie substantially in the same plane. The element 18 is stiffened by means of a center bar 19 which connects this element with the bar 16. On the outer ends of the rear bar 16 are pivotally mounted at the pivot points 16$^a$ the rear disk gangs 20. The inner ends of these gangs are connected to the frame by means of rods 21 and adapted to be angled by means of levers 22 and quadrants 23, as in the case of the gangs of the front sections.

As will be seen in Fig. 2, the stiffening bar 19 is spaced from and parallel to the plane of the converging side elements 17. This permits the draft bar 24 to slide therebetween, the ends of this bight portion 24$^a$ of the draft bar being hingedly connected at the ends 25 to the frame of the front section. This draft bar is preferably made of a general U-shape with converging sides 24 connected by an arcuate member 24$^a$. Loop members 24$^b$ are secured to each of the rearwardly converging sides 24 of the draft or bight portion, and these are adapted when the front and rear sections of the harrow are in operation, to fall at the intersection of the elements 17 and 18 of the rear harrow frame and to form loose couplings enclosing the frame at this point. The draft member is, moreover, forced into the corner of the angle by means of guides 26 which also act as stiffening members for the rear frame and lever support.

It will be seen from this description that the frames are telescopically connected so that they will tend to approach each other as the harrow is backed, or in the operation of turning. In that case one side of draft member 24 will remain in contact with the element 18 while the one on the inner side of the turn will swing back, thereby permitting the inner ends of the harrow to approach each other.

While I have shown and described but a single embodiment which my invention may assume, it is to be understood that it is capable of modification. Changes, therefore, in the construction and arrangement of parts may be made without departing from the spirit and scope of the invention as expressed in the following claims:

1. In a tillage implement, front and rear sections, a curved bar hingedly connected to one section at its ends and having its bight portion telescopically mounted on the other section, and stops on the arms of said bar for limiting its outward movement on said section.

2. In a tillage implement, front and rear sections, a curved bar connected to one section at its ends and having its bight portion telescopically mounted on the other section and means for limiting movement of said bar on said section.

3. A tillage implement having front and rear sections each carrying a U shaped frame or draft member, said U shaped members being disposed in a horizontal plane and overlapping at their central portions, and connections between the U shaped members permitting pivotal motion therebetween at either of two laterally spaced points.

4. In a tillage implement, front and rear sections, a curved bar attached to the front section at its ends, a frame on the rear section, said curved bar forming a draft connection between the sections and having its bight portion telescopically connected to said frame.

5. In a tillage implement, front and rear sections, a curved bar attached to the front section at its ends, a frame on the rear section having inclined guiding elements on its forward portion, and coupling elements connected to said curved bar and forming draft connections between the sections at the forward ends of said guiding elements.

6. In a tillage implement, front and rear sections, a curved bar attached to the front section at its ends, an angular frame on the rear section having inclined guiding elements at the forward corners of the frame, coupling elements connected to said curved bar and forming draft connections between the sections at the forward ends of said guiding elements, and means included in said connections for permitting horizontal swinging movement of the sections relative to each other.

7. In a tillage implement, front and rear sections, a curved bar attached to the front section at its ends, an angular frame on the rear section having inclined guiding elements at the forward corners of the frame, coupling elements comprising loop members connected to said curved bar and embracing the frame at the forward ends of said guiding elements, and a member on said frame engaging the central portion of said curved bar.

In testimony whereof I affix my signature.

CHARLES S. SHARP.